United States Patent
He et al.

(10) Patent No.: US 11,814,314 B2
(45) Date of Patent: Nov. 14, 2023

(54) COATING FOR GLASS AND FORMING METHOD THEREOF, AND AUTOMOTIVE WINDOW

(71) Applicant: SAINT-GOBAIN GLASS FRANCE, Courbevoie (FR)

(72) Inventors: Tao He, Shanghai (CN); Yunxin Gu, Shanghai (CN); Ce Shi, Shanghai (CN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 474 days.

(21) Appl. No.: 16/323,150

(22) PCT Filed: Jul. 17, 2017

(86) PCT No.: PCT/CN2017/093107
§ 371 (c)(1),
(2) Date: Feb. 4, 2019

(87) PCT Pub. No.: WO2018/024090
PCT Pub. Date: Feb. 8, 2018

(65) Prior Publication Data
US 2019/0169067 A1   Jun. 6, 2019

(30) Foreign Application Priority Data
Aug. 5, 2016 (CN) .......................... 201610638326.6

(51) Int. Cl.
*C03C 17/34* (2006.01)
*C09D 5/00* (2006.01)
(Continued)

(52) U.S. Cl.
CPC ......... *C03C 17/3405* (2013.01); *B60J 1/2094* (2013.01); *C09D 5/00* (2013.01);
(Continued)

(58) Field of Classification Search
CPC .... C03C 17/3405; C09D 5/00; C09D 183/04; C09D 129/14; C09D 175/04; B60J 1/2094
(Continued)

(56) References Cited

U.S. PATENT DOCUMENTS 4,364,786 A    12/1982  Smith, Jr. et al.
4,923,757 A *   5/1990  O'Dwyer .......... B32B 17/10018
                                          428/423.3
(Continued)

FOREIGN PATENT DOCUMENTS

CN   101290145 A   10/2008
CN   101722697 A    6/2010
(Continued)

OTHER PUBLICATIONS

International Search Report as issued in International Patent Application No. PCT/CN2017/093107, dated Oct. 10, 2017.
(Continued)

*Primary Examiner* — Tahseen Khan
(74) *Attorney, Agent, or Firm* — Pillsbury Winthrop Shaw Pittman LLP

(57) ABSTRACT

A coating for a glass and a forming method thereof, and an automotive window are provided. The coating includes: a first material layer which has a first elastic modulus; and a second material layer which includes at least one material layer, wherein the second material layer has a first surface and a second surface opposite to the first surface, the first surface is used for disposing the first material layer, the second surface is adaptable for facing a surface of the glass when the coating is applied on the glass, and the second material layer has a second elastic modulus less than the first elastic modulus. Anti-scratch ability of the coating and scratch resistance of the automotive window may be (Continued)

improved, which avoids scratches on the automotive window.

30 Claims, 3 Drawing Sheets

(51) Int. Cl.
    *C09D 183/04*     (2006.01)
    *B60J 1/20*     (2006.01)
    *C09D 129/14*     (2006.01)
    *C09D 175/04*     (2006.01)

(52) U.S. Cl.
    CPC ......... *C09D 129/14* (2013.01); *C09D 175/04* (2013.01); *C09D 183/04* (2013.01); *C03C 2217/78* (2013.01)

(58) Field of Classification Search
    USPC .......................................................... 428/213
    See application file for complete search history.

(56) References Cited

U.S. PATENT DOCUMENTS

| | | | |
|---|---|---|---|
| 5,277,944 A * | 1/1994 | Holzer | C08G 18/792 427/164 |
| 6,489,015 B1 | 12/2002 | Tsuchiya et al. | |
| 9,079,480 B1 | 7/2015 | Williams | |
| 2005/0077002 A1 * | 4/2005 | Anderson | C08G 18/4261 428/210 |
| 2006/0008658 A1 * | 1/2006 | Fukatani | B32B 17/10568 428/437 |
| 2007/0160852 A1 * | 7/2007 | Anderson | B32B 17/10761 428/522 |
| 2008/0190547 A1 * | 8/2008 | White | B60J 1/2094 156/108 |
| 2010/0092119 A1 * | 4/2010 | Angenheister | F16C 11/0633 384/498 |
| 2010/0167061 A1 * | 7/2010 | Bennison | B32B 17/10743 428/476.3 |
| 2010/0237644 A1 | 9/2010 | Senge | |
| 2011/0062148 A1 | 3/2011 | Kumaria et al. | |
| 2011/0151218 A1 * | 6/2011 | Meyer Zu Berstenhorst | C09D 7/48 428/447 |
| 2012/0003427 A1 * | 1/2012 | Kuroda | B32B 3/30 428/141 |
| 2012/0224264 A1 * | 9/2012 | Chiba | G02B 5/3066 359/573 |
| 2013/0309476 A1 * | 11/2013 | Ikenaga | B32B 27/08 428/220 |
| 2014/0028048 A1 | 1/2014 | Kornexl | |
| 2014/0106150 A1 * | 4/2014 | Decker | C03C 17/42 428/216 |
| 2014/0205805 A1 * | 7/2014 | Takihara | G02B 1/14 428/142 |
| 2015/0048078 A1 | 2/2015 | Morf et al. | |
| 2015/0165733 A1 * | 6/2015 | Takihara | B32B 27/08 428/141 |
| 2017/0050415 A1 * | 2/2017 | Kanki | B32B 17/10036 |
| 2018/0179350 A1 * | 6/2018 | Lee | C08L 83/04 |

FOREIGN PATENT DOCUMENTS

| | | |
|---|---|---|
| CN | 102145980 A | 8/2011 |
| CN | 102407753 A | 4/2012 |
| CN | 101652260 B | 5/2012 |
| CN | 102781868 A | 11/2012 |
| CN | 103042790 A | 4/2013 |
| CN | 101754843 B | 6/2013 |
| CN | 104561898 A | 4/2015 |
| CN | 104828868 A | 8/2015 |
| CN | 105984190 A | 10/2016 |
| CN | 207128588 U | 3/2018 |
| CN | 108099554 A | 6/2018 |
| EA | 025305 B1 | 12/2016 |
| EP | 2 060 546 A1 | 5/2009 |
| EP | 2 522 691 A2 | 11/2012 |
| EP | 3 112 325 A1 | 1/2017 |
| EP | 3 235 636 A1 | 10/2017 |
| JP | H04-93245 A | 3/1992 |
| JP | H08-112832 A | 5/1996 |
| JP | 2000-052472 A | 2/2000 |
| JP | 2000-282225 A | 10/2000 |
| JP | 2001-192242 A | 7/2001 |
| JP | 2003-316276 A | 11/2003 |
| JP | 2005-508787 A | 4/2005 |
| JP | 2006-192658 A | 7/2006 |
| JP | 2011-056876 A | 3/2011 |
| JP | 2012-181480 A | 9/2012 |
| JP | 2013-003383 A | 1/2013 |
| JP | 2015-536893 A | 12/2015 |
| KR | 10-2011-0099686 A | 9/2011 |
| KR | 10-2016-0020299 A | 2/2016 |
| KR | 20-2017-0002656 U | 7/2017 |
| RU | 2673304 C2 | 11/2018 |
| WO | WO 2006/011461 A1 | 2/2006 |
| WO | WO 2011/151885 A1 | 12/2011 |
| WO | WO 2014/112481 A1 | 7/2014 |
| WO | WO-2015122507 A1 * | 8/2015 ....... B32B 17/10036 |
| WO | WO 2015/129758 A1 | 9/2015 |
| WO | WO 2016/098769 A1 | 6/2016 |

OTHER PUBLICATIONS

Office Action as issued in Indian Patent Application No. 201917001822, dated Mar. 4, 2020.
Office Action as issued in Chinese Patent Application No. 201610638326.6, dated Mar. 19, 2020.
Office Action as issued in Indonesian Patent Application No. PID201901037, dated Aug. 13, 2020.
Office Action as issued in Eurasian Patent Application No. 201990444, dated Aug. 12, 2020.
Notice of Reasons for Refusal as issued in Japanese Patent Application No. 2019-505433, dated Nov. 2, 2021.
Office Action as issued in Eurasian Patent Application No. 201990444, dated Apr. 9, 2021.
Notice of Reasons for Refusal as issued in Japanese Patent Application No. 2019- 505433, dated Apr. 6, 2021.
Preliminary Office Action as issued in Brazilian Patent Application No. BR112019001214-1, dated Aug. 10, 2021.
Notification of Reasons for Refusal as issued in Korean Patent Application No. 10-2019-7003442, dated Aug. 23, 2021.
Ivanov, I. V., "Analysis, modelling, and optimization of laminated glasses as plane beam", International Journal of Solids and Structures, vol. 43, No. 22-23, (2006), 21 pages.
Tang, L., et al., "A facile route for irreversible bonding of plastic-PDMS hybrid microdevices at room temperature", Lab on a Chip, The Royal Society of Chemistry, vol. 10, No. 10, (2010), pp. 1274-1280.
First Examination Report as issued in Indian Patent Application No. 202017008242, dated Mar. 23, 2022.
First Notice of Preliminary Rejection as issued in Korean Patent Application No. 10-2017-0163478, dated Mar. 28, 2022.
Examination Report as issued in Indian Patent Application No. 202017008989, dated Mar. 30, 2022.
Notice of Reasons for Rejection as issued in Japanese Patent Application No. 2019-505433, dated May 24, 2022.
Second Office Action as issued in Chinese Patent Application No. 201711477227.5, dated Feb. 8, 2022.
Office Action as issued in Eurasian Patent Application No. 201990444, dated Dec. 17, 2021.
First Examination Report as issued in Indian Patent Application No. 202017018647, dated Jan. 3, 2022.
Office Action and Search Report as issued in Russian Patent Application No. 2021120395, dated Dec. 20, 2021.

(56) References Cited

OTHER PUBLICATIONS

Office Action and Search Report as issued in Russian Patent Application No. 2021121577, dated Dec. 20, 2021.
European Search Report as issued in European Patent Application No. 17836272.9, dated Jan. 26, 2021.

\* cited by examiner

COATING FOR GLASS AND FORMING METHOD THEREOF, AND AUTOMOTIVE WINDOW

CROSS-REFERENCE TO RELATED APPLICATIONS

This application is the U.S. National Stage of PCT/CN2017/093107, filed Jul. 17, 2017, which in turn claims the benefit of priority to Chinese Patent Application No. 201610638326.6, filed on Aug. 5, 2016, and entitled "COATING FOR GLASS AND FORMING METHOD THEREOF, AND AUTOMOTIVE WINDOW", the entire disclosure of which is incorporated herein by reference.

TECHNICAL FIELD

The present disclosure generally relates to a technical field of automotive window glass, and more particularly, to a coating for a glass and a forming method thereof, and an automotive window.

BACKGROUND

At present, with the rapid development of the automotive industry, China has become a major consumer of automobiles. Scratch resistance is one of essential performance of automobiles. For example, once an automotive window glass is scratched, not only the appearance but also the safety of the automobile will be affected.

In order to improve the scratch resistance of the automotive window glass, usually an anti-scratch coating is attached to the automotive window glass to avoid damage (such as scratches) on the automotive window glass by an external scratch force. In existing techniques, the anti-scratch coating is typically a relatively hard layer of PET material or other materials.

However, anti-scratch ability of the anti-scratch coating provided in the existing techniques needs to be further improved, and scratch resistance of the automotive window glass is relatively poor.

SUMMARY

In embodiments of the present disclosure, a coating for a glass and a forming method thereof, and an automotive window are provided, to improve anti-scratch ability of the coating and scratch resistance of the automotive window.

In an embodiment of the present disclosure, a coating for a glass is provided, including: a first material layer having a first elastic modulus; and a second material layer including at least one material layer, wherein the second material layer has a first surface and a second surface opposite to the first surface, the first surface is used for disposing the first material layer, the second surface is adaptable for facing a surface of the glass when the coating is applied on the glass, and the second material layer has a second elastic modulus less than the first elastic modulus.

A basic idea lies in that the coating includes the first and second material layers with different hardness, and an external scratch force first acts on the first material layer when the coating is applied on the glass. As the first material layer is relatively hard, a surface of the coating can be prevented from being scratched. The external scratch force reaches the second material layer via the first material layer. As having relatively small hardness, the second material layer may deform under the effect of the external scratch force, so that the second material layer may absorb or disperse the external scratch force to weaken its strength. In this way, strength of the external scratch force on the glass via the coating may be relatively low, which makes the coating possess relatively strong anti-scratch ability.

In another embodiment of the present disclosure, a method for forming a coating for a glass is provided, including: forming a first material layer having a first elastic modulus; and forming a second material layer which has a first surface and a second surface opposite to the first surface, wherein the first surface is used for disposing the first material layer, the second surface is adaptable for facing a surface of the glass when the coating is applied on the glass, and the second material layer has a second elastic modulus less than the first elastic modulus.

A basic idea lies in that anti-scratch ability of the coating is improved by forming the first and second material layers with different hardness.

In another embodiment of the present disclosure, an automotive window is provided, including: an automotive window glass which has two surfaces opposite to each other; and the above-mentioned coating, wherein the coating is disposed on at least one of the two surfaces of the automotive window glass, and the second surface of the second material layer faces the at least one of the two surfaces of the automotive window glass.

A basic idea lies in that the coating is disposed on the surface of the automotive window glass, the first material layer of the coating which has relatively great hardness may prevent the coating from being damaged by an external scratch force, and the second material layer of the coating which has a function of absorbing or dispersing the external scratch force may weaken strength of the external scratch force on the surface of the automotive window glass, so that scratch resistance of the automotive window glass may be improved.

DETAILED DESCRIPTION

As described in the background, anti-scratch ability of the anti-scratch coating provided in the existing techniques needs to be further improved.

It is found that, existing anti-scratch coatings generally include a material layer with relatively great hardness. The material layer with relatively great hardness is employed to prevent a glass from being scratched by an external scratch force.

However, as the material layer is relatively hard, deformation of the material layer may be relatively small when the external scratch force acts on the material layer, so that effect of the external scratch force is concentrated in an area of the material layer. The external scratch force on the glass via the material layer still has relatively high strength, which may make the glass be easily damaged by the external scratch force. Therefore, the anti-scratch ability of the anti-scratch coating needs to be improved.

To solve or mitigate the above problems, an embodiment of the present disclosure provides a coating for a glass to improve anti-scratch ability of the coating.

In order to clarify the object, characteristic and advantages of embodiments of the present disclosure, embodiments of present disclosure will be described clearly in detail in conjunction with accompanying drawings.

Figure 1:
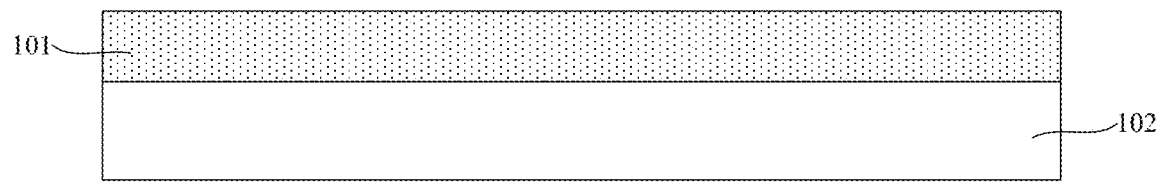
FIG. 1 schematically illustrates a sectional view of a coating for a glass according to an embodiment.

FIG. 1 schematically illustrates a sectional view of a coating for a glass according to an embodiment.

Referring to FIG. 1, the coating for the glass includes: a first material layer 101 having a first elastic modulus; and a second material layer 102 including at least one material layer, wherein the second material layer 102 has a first surface (not shown in FIG. 1) and a second surface (not shown in FIG. 1) opposite to the first surface, the first surface is used for disposing the first material layer 101, the second surface is adaptable for facing a surface of the glass when the coating is applied on the glass, and the second material layer 102 has a second elastic modulus less than the first elastic modulus.

The coating provided in the embodiment is described in detail below.

When being applied on the glass, the coating is used for preventing the glass from being scratched so as to avoid a scratch on the glass, which may improve scratch resistance of the glass. As an external scratch force first acts on the first material layer 101, the first material layer 101 should have relatively great hardness to ensure good scratch resistance. Therefore, the first material layer 101 may have a relatively great elastic modulus.

To ensure that a surface of the first material layer 101 possesses good scratch resistance, the first elastic modulus of the first material layer 101 should not be too small.

In some embodiments, the first elastic modulus may be greater than 100 Mpa under a room temperature and a quasi-static condition, wherein the room temperature is within a range from 21° C. to 25° C., such as 21° C., 22° C., 23° C., 24° C. or 25° C., and a strain rate of material in the quasi-static condition is less than 0.01/s.

In some embodiments, the first material layer 101 includes at least one material of polyethyleneterephthalate (PET), polyurethane (PU), polycarbonate (PC), acrylonitrile butadiene styrene copolymers (ABS) and polymethyl methacrylate (PMMA).

In some embodiments, the first material layer 101 may include a material having a first porosity within a range from 50% to 65%, such as 50%, 55%, 58%, 60%, 63% or 65%, and the material having the first porosity may be a one-component polyurethane foam sealing agent (PU foam) having the first porosity.

In some embodiments, along a direction from the second material layer 102 towards the first material layer 101, the first elastic modulus of the first material layer 101 is a constant value.

In other embodiments, along the direction from the second material layer towards the first material layer, the first elastic modulus of the first material layer gradually increases. That is, along the direction from the second material layer towards the first material layer, hardness of the first material layer gradually increases, so that the surface of the first material layer has relatively great hardness to prevent a surface of the coating from being scratched by an external scratch force. Besides, along a direction from the first material layer towards the second material layer, the hardness of the first material layer gradually decreases. When the external scratch force is applied to the surface of the coating, the first material layer possesses ability of absorbing or dispersing the external scratch force.

It should be noted that, when the first elastic modulus of the first material layer gradually increases along the direction from the second material layer towards the first material layer, and the first material layer includes the material having the first porosity, the first porosity of the first material layer gradually decreases to make the first elastic modulus of the first material layer gradually increase.

In the embodiment, the second material layer 102 is exemplified as a single material layer.

When the coating is applied on the glass, a distance between the second material layer 102 and the surface of the glass is shorter than a distance between the first material layer 101 and the surface of the glass. As the second elastic modulus of the second material layer 102 is less than the first elastic modulus of the first material layer 101, the hardness of the second material layer 102 is less than that of the first material layer 101. After the external scratch force is applied to the surface of the first material layer 101, the external scratch force is delivered to the second material layer 102 via the first material layer 101, and the second material layer 102 deforms under the effect of the external scratch force so as to absorb the external scratch force. Additionally, deformation of the second material layer 102 under the effect of the external scratch force makes the external scratch force be dispersed. In this way, strength of the external scratch force on the surface of the glass via the second material layer 102 is significantly weakened, so that the surface of the glass is effectively prevented from being scratched.

If the hardness of the second material layer 102 is too great, the deformation of the second material layer 102 may be relatively small. Accordingly, the ability of absorbing or dispersing the external scratch force may be relatively poor, and further the external scratch force may be weakened slightly via the second material layer 102. Therefore, the second elastic modulus of the second material layer 102 cannot be too great.

In some embodiments, the second elastic modulus is less than 50 Mpa under the room temperature and the quasi-static condition. Definitions of the room temperature and the quasi-static condition can be referred to the above descriptions, and are not described in detail here.

In some embodiments, a ratio of the first elastic modulus to the second elastic modulus should not be too small. If the ratio of the first elastic modulus to the second elastic modulus is too small, a hardness difference between the first material layer 101 and the second material layer 102 may be too small, which may cause the second material layer 102 to possess relatively poor ability of absorbing or dispersing the external scratch force. In some embodiments, the ratio of the first elastic modulus to the second elastic modulus is greater than or equal to 10.

Besides, thickness of the second material layer 102 should not be too great. If the thickness of the second material layer 102 is too great, the deformation of the second material layer 102 under the effect of the external scratch force may be too great when the coating is applied on the surface of the glass, which may easily cause de-lamination or fracture of the second material layer 102. Therefore, in some embodiments, the thickness of the second material layer 102 is less than or equal to 500 μm.

To ensure that the second material layer 102 has strong ability of absorbing or dispersing the external scratch force, the thickness of the second material layer 102 is greater than that of the first material layer 101.

In some embodiments, along the direction from the second material layer 102 towards the first material layer 101, the second elastic modulus of the second material layer 102 is a constant value.

In other embodiments, along the direction from the second material layer towards the first material layer, the second elastic modulus of the second material layer gradually increases. When the coating is applied on the glass, along the direction from the first material layer towards the surface of the glass, the hardness of the second material layer gradually decreases, and the ability of absorbing or dispersing the external scratch force may be stronger gradually. As the hardness of the second material layer gradually increases along a direction from the surface of the glass towards the second material layer, the second material layer may be prevented from being delaminated by the external scratch force.

It should be noted that, thickness of the second material layer 102 is related to the second elastic modulus. In some embodiments, the greater the second elastic modulus is, the harder the second material layer 102 is. The second material layer 102 with greater hardness and the same thickness may possess weaker ability of absorbing or dispersing the external scratch force. Therefore, to ensure that the second material layer 102 possesses relatively strong ability of absorbing or dispersing the external scratch force, the greater the second elastic modulus is, the thicker the second material layer 102 should be.

In some embodiments, when the second elastic modulus of the second material layer 102 is within a range from 5 Mpa to 10 Mpa, such as 5 Mpa, 6.5 Mpa, 8 Mpa, 9 MPa or 10 Mpa, under the room temperature and the quasi-static condition, the thickness of the second material layer 102 may be within a range from 50 μm to 500 μm, such as 50 μm, 70 μm, 150 μm, 260 μm, 400 μm or 500 μm; when the second elastic modulus of the second material layer 102 is within a range from 0.1 Mpa to 0.5 Mpa, such as 0.1 Mpa, 0.3 Mpa or 0.5 Mpa, under the room temperature and the quasi-static condition, the thickness of the second material layer 102 may be within a range from 10 μm to 200 μm, such as 10 μm, 110 μm or 200 μm.

In some embodiments, the second material layer 102 includes at least one material of polydimethylsiloxane (PDMS), PU and PU foam.

In some embodiments, the second material layer 102 may include a material having a second porosity, such as PU foam having the second porosity. When the first material layer 101 includes the material having the first porosity and the second material layer 102 includes the material having the second porosity, the first porosity is less than or equal to the second porosity, so that the second elastic modulus of the second material layer 102 is less than the first elastic modulus of the first material layer 101.

In some embodiments, when the second material layer 102 includes the material having the second porosity the second porosity may be within a range from 65% to 80%, such as 65%, 70%, 74%, 77% or 80%.

In some embodiments, when the second material layer 102 includes the material having the second porosity, along the direction from the second material layer 102 towards the first material layer 101, the second porosity of the second material layer 102 may be a constant value, in some embodiments, when the second material layer 102 includes the material having the second porosity, along the direction from the second material layer 102 towards the first material layer 101, the second porosity of the second material layer 102 may gradually increase, so that the second elastic modulus of the second material layer 102 gradually increases.

In some embodiments, the first surface of the second material layer 102 may be attached with the first material layer 101. In some embodiments, to improve adhesion between the first material layer and the second material layer, the coating may further include an adhesive layer disposed between the first material layer and the first surface of the second material layer.

In some embodiments, the adhesive layer may include at least one material of polyvinyl butyral and methane diisocyanate.

Thickness of the adhesive layer should not be too small or too great. If the thickness of the adhesive layer is too small, the adhesion between the first material layer and the second material layer may be relatively weak; and if the thickness of the adhesive layer is too great, the effect of absorbing or dispersing the external scratch force by the second material layer may be affected. Therefore, the thickness of the adhesive layer may be within a range from 5 μm to 15 μm, such as 5 μm, 8 μm, 10 μm, 13 μm or 15 μm.

Figure 2:
FIG. 2 schematically illustrates a distribution diagram of an external scratch force when a scratch test s performed to a coating for a glass according to an embodiment.

FIG. 2 schematically illustrates a distribution diagram of an external scratch force when a scratch test is performed to the coating for the glass. Referring to FIG. 2, a diamond indenter 10 is employed to apply to the first material layer (not shown FIG. 2) an external scratch force perpendicular to the second surface of the first material layer. A brighter portion of the coating illustrates the distribution of the external scratch force in the coating. The external scratch force is absorbed in the coating and dispersed along a direction parallel to the second surface, so that strength of the external scratch force on the second surface of the second material layer (not shown in FIG. 2) is significantly weakened, which may effectively prevent the surface of the glass from being scratched by the external scratch force.

Figure 3:
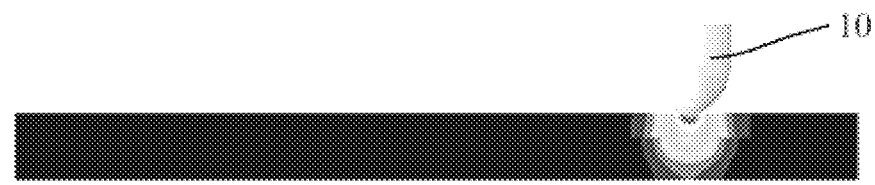
FIG. 3 schematically illustrates a distribution diagram of an external scratch force when a scratch test is performed to a single-layer coating of a relatively hard material according to an embodiment.

FIG. 3 schematically illustrates a distribution diagram of an external scratch force when a scratch test is performed to a single-layer coating of a relatively hard material according to an embodiment. Referring to FIG. 3, a diamond indenter 10 is employed to apply to the coating an external scratch force perpendicular to a surface of the coating. A brighter portion of the coating illustrates the distribution of the external scratch force in the coating. The external scratch force is concentrated in a small region of the coating, so that the external scratch force at the bottom of the coating still has high strength, which makes scratches be easily formed on the surface of the glass.

Figure 4:
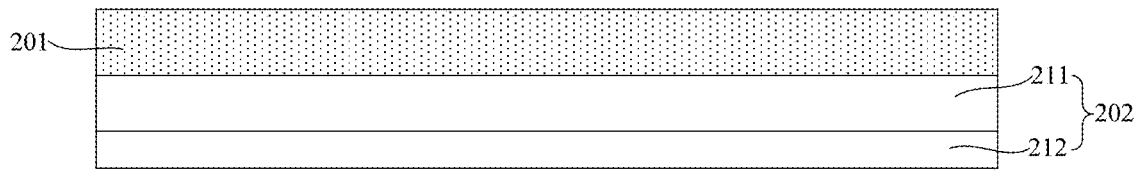
FIG. 4 schematically illustrates a sectional view of a coating for a glass according to an embodiment.

In another embodiment, a coating for a glass is provided. FIG. 4 schematically illustrates a sectional view of the coating for the glass according to the embodiment.

Referring to FIG. 4, the coating for the glass includes: a first material layer 201 having a first elastic modulus; and a second material layer 202 including at least one material layer, wherein the second material layer 202 has a first surface and a second surface opposite to the first surface, the first surface is used for disposing the first material layer 201, the second surface is adaptable for facing a surface of the glass when the coating is applied on the glass, and the second material layer 202 has a second elastic modulus less than the first elastic modulus.

The coating provided in the embodiment is described in detail below.

Details of the first material layer 201 may be referred to the descriptions of the above embodiments, and are not described in detail here. In some embodiments, along a direction from the second material layer 202 towards the first material layer 201, the first elastic modulus of the first material layer 201 gradually increases. In some embodiments, along the direction from the second material layer towards the first material layer, the first elastic modulus of the first material layer may be a constant value.

In some embodiments, a ratio of the first elastic modulus to the second elastic modulus may be greater than or equal to 10; and the second elastic modulus is less than 50 Mpa under a room temperature and a quasi-static condition.

In some embodiments, thickness of the second material layer 202 is greater than that of the first material layer 201. In some embodiments, the thickness of the second material layer 202 is less than or equal to 500 μm.

A material of the second material layer 202 may be referred to the descriptions of the above embodiments, and is not described in detail here.

In some embodiments, the second material layer 202 includes a third material layer 211 and a fourth material layer 212 which are laminated, wherein the third material layer 211 has the first surface, the fourth material layer 212 has the second surface, and an elastic modulus of the third material layer 211 is greater than an elastic modulus of the fourth material layer 212.

As the elastic modulus of the third material layer 211 is greater than the elastic modulus of the fourth material layer 212, the third material layer 211 is harder than the fourth material layer 212. When the coating is applied on the glass, a distance between the fourth material layer 212 and the surface of the glass is shorter than a distance between the third material layer 211 and the surface of the glass, and the fourth material layer 212 closer to the surface of the glass has stronger ability of absorbing or dispersing the external scratch force than the third material layer 211, which makes the second material layer 202 possess strong ability of absorbing or dispersing the external scratch force. Besides, the external scratch force acting on the third material layer 211 is stronger than that acting on the fourth material layer 212. As the third material layer 211 is relatively hard, the third material layer 211 may be prevented from being delaminated under the effect of the external scratch force.

When the coating is applied on the glass, the fourth material layer 212 is closest to the surface of the glass. To make the fourth material layer 212 possess strong ability of absorbing or dispersing the external scratch force, the elastic modulus of the fourth material layer 212 may not be too great. Besides, as strength of the external scratch force on the fourth material layer 212 is relatively low, the fourth material layer 212 may not be prone to be delaminated even if its elastic modulus is relatively small.

In some embodiments, the elastic modulus of the fourth material layer 212 is less than or equal to 10 Mpa.

In some embodiments, the second material layer 202 has a gradient elastic modulus (the elastic modulus in the second material layer 202 gradually changes), so that the second material layer 202 not only has strong ability of absorbing or dispersing the external scratch force, but also always possesses good performance when the coating is applied on the glass, which may prevent the second material layer 202 from being delaminated under the effect of the external scratch force.

In some embodiments, the third material layer 211 includes at least two layers. Along the direction from the second material layer 202 towards the first material layer 201, the elastic modulus of the third material layer 211 gradually increases, thus, the third material layer 211 has a gradient elastic modulus, which enables the third material layer 211 to possess strong ability of absorbing or dispersing the external scratch force, and avoids de-lamination of the third material layer 211.

In some embodiments, the third material layer may be a single layer, and has a constant elastic modulus. Optionally, along the direction from the second material layer towards the first material layer, the elastic modulus of the third material layer gradually increases.

In some embodiments, the third material layer may be a single layer, and the third material layer includes a material having a third porosity. Along the direction from the second material layer towards the first material layer, the third porosity of the third material layer gradually decreases, so that the elastic modulus of the third material layer gradually increases. In some embodiments, the third material layer may be a single layer, and the third material layer includes a material having a third porosity, where the third porosity is a constant value, and thus the elastic modulus of the third material layer is a constant value.

In some embodiments, the first surface of the second material layer 202 is attached with the first material layer 201. In some embodiments, to improve adhesion between the first material layer and the second material layer, the coating may further include an adhesive layer disposed between the first material layer and the first surface of the second material layer.

In some embodiments, the adhesive layer may include at least one material of polyvinyl butyral and methane diisocyanate. Thickness of the adhesive layer should not be too small or too great. If the thickness of the adhesive layer is too small, the adhesion between the first material layer and the second material layer may be relatively weak; and if the thickness of the adhesive layer is too great, the effect of absorbing or dispersing the external scratch force by the second material layer may be affected. Therefore, the thickness of the adhesive layer may be within a range from 5 μm to 15 μm, such as 5 μm, 8 μm, 10 μm, 13 μm or 15 μm.

In an embodiment, a method for forming a coating for a glass is provided, including: forming a first material layer having a first elastic modulus; and forming a second material layer which has a first surface and a second surface opposite to the first surface, wherein the first surface is used for disposing the first material layer, the second surface is adaptable for facing a surface of the glass when the coating is applied on the glass, and the second material layer has a second elastic modulus less than the first elastic modulus.

The method is described in detail below in conjunction with figures.

Figure 5:
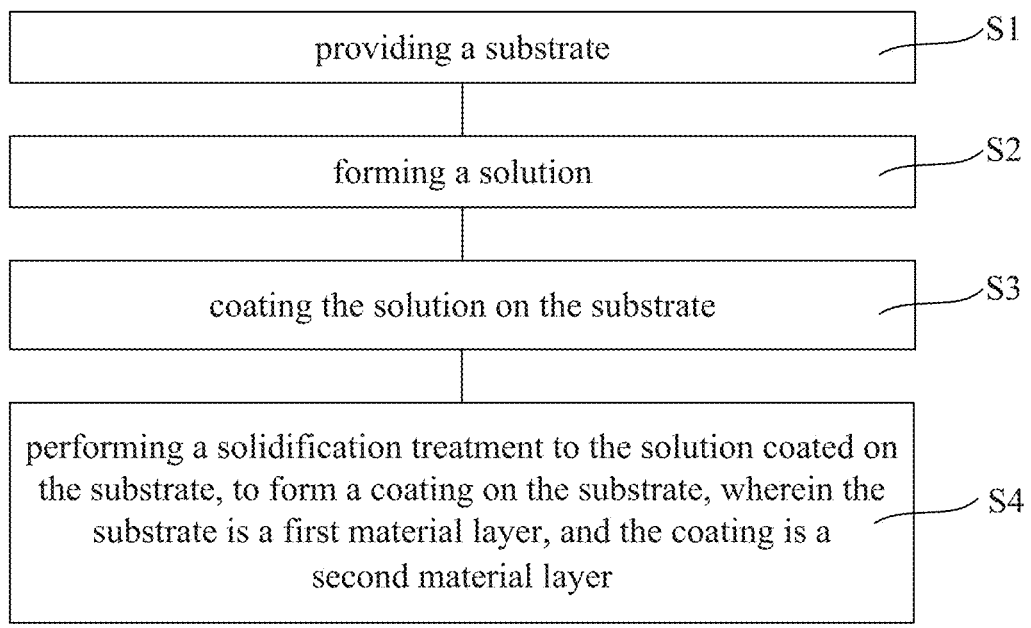
FIG. 5 schematically illustrates a flow chart of a forming method according to an embodiment.

FIG. 5 schematically illustrates a flow chart of the method according to the embodiment.

Referring to FIG. 5, the method includes:
S1, providing a substrate;
S2, forming a solution;
S3, coating the solution on the substrate; and
S4, performing a solidification treatment to the solution coated on the substrate, to form a coating on the substrate, wherein the substrate is the first material layer, and the coating is the second material layer.

In some embodiments, the substrate includes at least one material of PET, PU, PC, ABS and PMMA. In some embodiments, the substrate may include a material having a first porosity within a range from 50% to 65%, such as 50%, 58%, 60%, 63% or 65%.

In some embodiments, the coating includes at least one material of PDMS, PU and PU foam. In some embodiments, the coating may include a material having a second porosity within a range from 65% to 80%, such as 65%, 70%, 74%, 77% or 80%.

In some embodiments, the material of the coating is polydimethylsiloxane, the solution includes a primary solvent and a solidification solvent, and forming the solution includes: mixing the primary solvent d the solidification solvent with a volume ratio within a range from 8 to 11, to obtain a mixed solution; and stirring the mixed solution. For example, the volume ratio of the primary solvent to the solidification solvent may be 8:1, 10:1 or 11:1.

In some embodiments, the material of the coating is polyurethane, and forming the solution includes: adding methylbenzene and long-chain alkyl diol into a reaction vessel; stirring the methylbenzene and the long-chain alkyl diol to make the long-chain alkyl diol dissolved; adding methane diisocyanate into the methylbenzene with the dissolved long-chain alkyl diol; stirring the methane diisocyanate and the methylbenzene with the dissolved long-chain alkyl diol; and adding a catalyst into the methane diisocyanate and the methylbenzene with the dissolved long-chain alkyl diol, to make the methane diisocyanate and the methylbenzene with the dissolved long-chain alkyl diol be chemically reacted.

In some embodiments, the methylbenzene and the long-chain alkyl diol are stirred under a first temperature, and the methane diisocyanate and the methylbenzene with the dissolved long-chain alkyl diol are stirred under a second temperature, where the first temperature is within a range from 35° C. to 50° C., such as 35° C., 40° C., 45° C. or 50° C., and the second temperature is within a range from 60° C. to 80° C., such as 60° C., 66° C., 72° C. or 80° C.

In some embodiments, the method includes: providing a first material layer; providing a second material layer; and disposing the first material layer on the first surface of the second material layer via forming an adhesive layer on the first material layer or on the second material layer.

In the coating for the glass formed by the method provided in the above embodiments, the second material layer is softer than the first material layer. Therefore, when the coating is applied on the glass, an external scratch force first acts on the first material layer, and then reaches the second material layer via the first material layer. The second material layer deforms under the effect of the external scratch force, so that the external scratch force is absorbed or dispersed. Therefore, strength of the external scratch force on a surface of the glass via the second material layer is relatively low, which may prevent the surface of the glass from being scratched.

Figure 6:
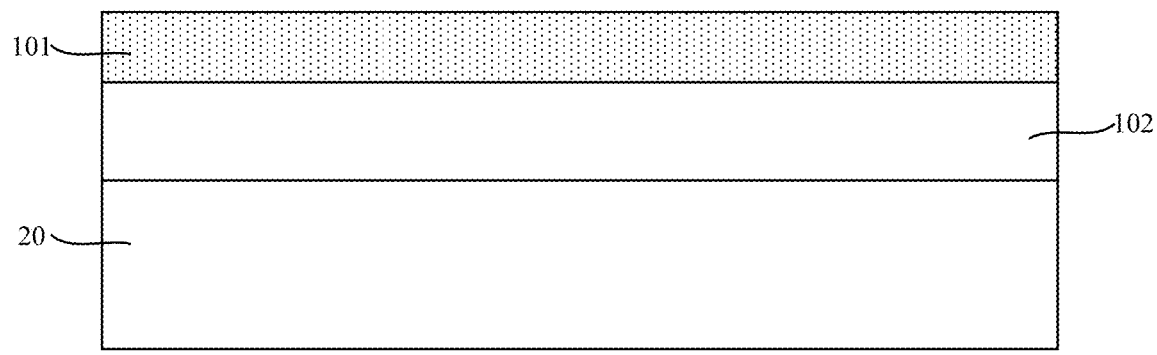
FIG. 6 schematically illustrates a sectional view of an automotive window according to an embodiment.

In an embodiment, an automotive window is provided. FIG. 6 schematically illustrates a sectional view of the automotive window according to the embodiment. Referring to FIG. 6, the automotive window includes: an automotive window glass 20 which has two surfaces opposite to each other; and the coating for the glass provided in the above embodiments, wherein the coating is disposed on at least one of the two surfaces of the automotive window glass 20, and the second surface of the second material layer 102 faces the at least one of the two surfaces of the automotive window glass 20.

In some embodiments, the two surfaces opposite to each other include an inner surface and an outer surface, where "inner" and "outer" are referred relative to an automotive body. In some embodiments, the coating is disposed on one surface of the automotive window glass 20, specifically, the outer surface of the automotive window glass 20. In some embodiments, the coating may be disposed on the two surfaces of the automotive window glass, i.e., both the inner and outer surfaces of the automotive window glass. In some embodiments, the coating is disposed on the inner surface of the automotive window glass.

In some embodiments, the coating includes: a first material layer 101 having a first elastic modulus; and a second material layer 102, wherein the second material layer 102 has a first surface and a second surface opposite to the first surface, the first surface is used for disposing the first material layer 101, the second surface is adaptable for facing a surface of the automotive window glass 20, and the second material layer 102 has a second elastic modulus less than the first elastic modulus.

Details of the coating can be referred to the above descriptions of FIG. 1, and are not described in detail here.

When the automotive window glass 20 is subjected to an external scratch force, the external scratch force first acts on the first material layer 101 with relatively great hardness, which effectively prevents the surface of the coating from being scratched. The external scratch force is delivered to the second material layer 102 via the first material layer 101, and the second material layer 102 with relatively small hardness deforms under the effect of the external scratch force, so that the second material layer 102 absorbs or disperses the external scratch force. In this way, strength of the external scratch force on the surface of the automotive window glass 20 via the second material layer 102 is significantly weakened, which may effectively prevent the automotive window glass 20 from being scratched and further improve scratch resistance of the automotive window.

Figure 7:
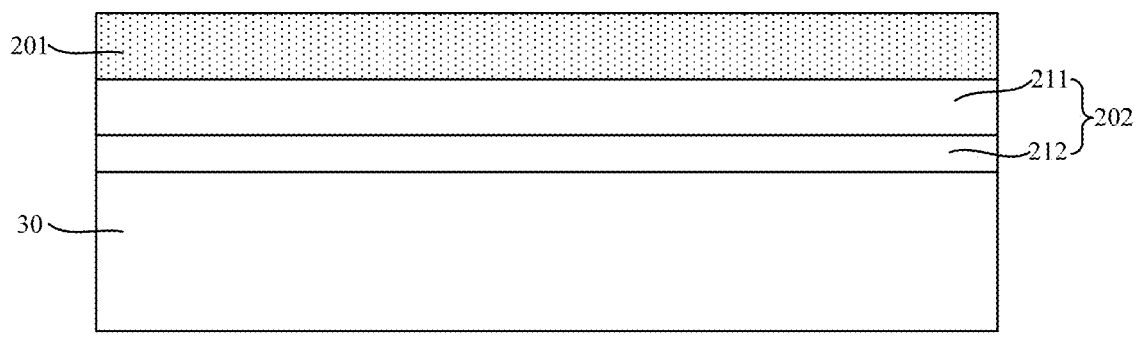
FIG. 7 schematically illustrates a sectional view of an automotive window according to an embodiment.

FIG. 7 schematically illustrates a sectional view of an automotive window according to an embodiment. Referring to FIG. 7, the automotive window includes: an automotive window glass 30 which has two surfaces opposite to each other; and the coating for the glass provided in the above embodiments, wherein the coating is disposed on at least one of the two surfaces of the automotive window glass 30, and the second surface of the second material layer 202 faces the at least one of is the two surfaces of the automotive window glass 30.

In some embodiments, the coating includes: a first material layer 201 having a first elastic modulus; and a second material layer 202, wherein the second material layer 202 has a first surface and a second surface opposite to the first surface, the first surface is used for disposing the first material layer 201, the second surface is adaptable for facing a surface of the automotive window glass 30, and the second material layer 202 has a second elastic modulus less than the first elastic modulus. In some embodiments, the second material layer 202 includes a third material layer 211 and a fourth material layer 212 which are laminated, wherein the third material layer 211 has the first surface, the fourth material layer 212 has the second surface, and an elastic modulus of the third material layer 211 is greater than an elastic modulus of the fourth material layer 212.

Details of the coating can be referred to the above descriptions of FIG. 4, and are not described in detail here.

When the automotive window glass 30 is subjected to an external scratch force, the external scratch force first acts on the first material layer 201 with relatively great hardness, which effectively prevents the surface of the coating from being scratched. The external scratch force is delivered to the second material layer 202 via the first material layer 201, and the second material layer 202 with relatively small hardness deforms under the effect of the external scratch force, so that the second material layer 202 absorbs or disperses the external scratch force. In this way, strength of the external scratch force on the surface of the automotive window glass 30 via the second material layer 202 is significantly weakened, which may effectively prevent the automotive window glass 30 from being scratched and further improve scratch resistance of the automotive window.

Besides, the second material layer 202 has a gradient elastic modulus. The external scratch force first reaches the third material layer 211 via the first material layer 201 and then reaches the fourth material layer 212, thus, the external scratch force subjected by the third material layer 211 is stronger than that subjected by the fourth material layer 212. As the third material layer 211 is harder than the fourth material layer 212, the third material layer 211 is not prone to be de-laminated when subjected to a relatively larger external scratch force. Further, the softer fourth material layer 212 may have stronger ability of absorbing or dispersing the external scratch force, which further weakens strength of the external scratch force on the surface of the automotive window glass 30 and improves scratch resistance of the automotive window.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A coating for a glass, comprising:
   a first material layer having a first elastic modulus; and
   a second material layer comprising at least one material layer, wherein the second material layer has a first surface and a second surface opposite to the first surface, the first surface is used for disposing the first material layer, the second surface is adaptable for facing an exposed surface of the glass when the coating is applied on the glass, and the second material layer has a second elastic modulus less than the first elastic modulus, wherein the second elastic modulus is less than 50 Mpa under a room temperature and a quasi-static condition,
   wherein a thickness of the second material layer is greater than a thickness of the first material layer, and
   wherein the first material layer comprises at least one material of polyethyleneterephthalate (PET), polyurethane, polycarbonate, acrylonitrile butadiene styrene copolymers and polymethyl methacrylate.

2. The coating according to claim 1, wherein a ratio of the first elastic modulus to the second elastic modulus is greater than or equal to 10.

3. The coating according to claim 1, wherein the first elastic modulus is greater than 100 Mpa under a room temperature and a quasi-static condition.

4. The coating according to claim 1, wherein the thickness of the second material layer is less than or equal to 500 μm.

5. The coating according to claim 1, wherein the second material layer comprises a third material layer and a fourth material layer which are laminated, wherein the third material layer has the first surface, the fourth material layer has the second surface, and an elastic modulus of the third material layer is greater than an elastic modulus of the fourth material layer.

6. The coating according to claim 1, wherein the second elastic modulus of the second material layer gradually increases along a direction from the second material layer towards the first material layer.

7. The coating according to claim 1, wherein the first elastic modulus of the first material layer gradually increases along a direction from the second material layer towards the first material layer.

8. The coating according to claim 5, wherein the elastic modulus of the fourth material layer is less than or equal to 10 Mpa.

9. The coating according to claim 5, wherein the third material layer comprises at least two layers, and the elastic modulus of the third material layer gradually increases along a direction from the second material layer towards the first material layer.

10. The coating according to claim 5, wherein the third material layer comprises one layer, the third material layer comprises a material having a third porosity, and the third porosity of the third material layer gradually decreases along a direction from the second material layer towards the first material layer.

11. The coating according to claim 1, wherein the second material layer comprises at least one material of polydimethylsiloxane, polyurethane and a one-component polyurethane foam sealing agent.

12. The coating according to claim 1, wherein the first material layer comprises a material having a first porosity, the second material layer comprises a material having a second porosity, and the first porosity is less than or equal to the second porosity.

13. The coating according to claim 12, wherein the first porosity is within a range from 50% to 65%, and the second porosity is within a range from 65% to 80%.

14. The coating according to claim 1, wherein the second elastic modulus is within a range from 5 Mpa to 10 Mpa under a room temperature and a quasi-static condition.

15. The coating according to claim 14, wherein the thickness of the second material layer is within a range from 50 μm to 500 μm.

16. The coating according to claim 1, wherein the second elastic modulus is within a range from 0.1 Mpa to 0.5 Mpa under a room temperature and a quasi-static condition.

17. The coating according to claim 16, wherein the thickness of the second material layer is within a range from 10 μm to 200 μm.

18. The coating according to claim 1, wherein the coating further comprises an adhesive layer disposed between the first material layer and the first surface of the second material layer.

19. The coating according to claim 18, wherein a material of the adhesive layer comprises at least one of polyvinyl butyral and methane diisocyanate.

20. The coating according to claim 18, wherein a thickness of the adhesive layer is within a range from 5 μm to 15 μm.

21. A method for forming a coating for a glass, comprising:
   forming a first material layer having a first elastic modulus; and
   forming a second material layer which has a first surface and a second surface opposite to the first surface, wherein the first surface is used for disposing the first material layer, the second surface is adaptable for facing an exposed surface of the glass when the coating is applied on the glass, and the second material layer has a second elastic modulus less than the first elastic modulus, wherein the second elastic modulus is less than 50 Mpa under a room temperature and a quasi-static condition, wherein a thickness of the second material layer is greater than a thickness of the first material layer, and wherein the first material layer comprises at least one material of polyethyleneterephthalate (PET), polyurethane, polycarbonate, acrylonitrile butadiene styrene copolymers and polymethyl methacrylate.

22. The method according to claim 21, wherein forming the first material layer comprises providing a substrate, and forming the second material layer comprises:

forming a solution;

coating the solution on the substrate; and performing a solidification treatment to the solution coated on the substrate, to form a coating on the substrate, wherein the substrate is the first material layer, and the coating is the second material layer.

23. The method according to claim 22, wherein during the solidification treatment, a solidification temperature is within a range from 65° C. to 100° C., and a solidification time period is within a range from 10 minutes to 4 hours.

24. The method according to claim 22, wherein a material of the coating comprises polydimethylsiloxane, the solution comprises a primary solvent and a solidification solvent, and forming the solution comprises: mixing the primary solvent and the solidification solvent with a volume ratio within a range from 8 to 11, to obtain a mixed solution; and stirring the mixed solution.

25. The method according to claim 22, wherein a material of the coating comprises polyurethane, and forming the solution comprises:

adding methylbenzene and long-chain alkyl diol into a reaction vessel;

stirring the methylbenzene and the long-chain alkyl diol to make the long-chain alkyl diol dissolved;

adding methane diisocyanate into the methylbenzene with the dissolved long-chain alkyl diol;

stirring the methane diisocyanate and the methylbenzene with the dissolved long-chain alkyl diol; and adding a catalyst into the methane diisocyanate and the methylbenzene with the dissolved long-chain alkyl diol, to make the methane diisocyanate and the methylbenzene with the dissolved long-chain alkyl diol be chemically reacted.

26. The method according to claim 25, wherein the methylbenzene and the long-chain alkyl diol are stirred under a first temperature within a range from 35° C. to 50° C., and the methane diisocyanate and the methylbenzene with the dissolved long-chain alkyl diol are stirred under a second temperature within a range from 60° C. to 80° C.

27. The method according to claim 21, wherein the method further comprises:

disposing the first material layer on the first surface of the second material layer via forming an adhesive layer on the first material layer or on the second material layer.

28. An automotive window, comprising:

an automotive window glass which has two surfaces opposite to each other; and the coating according to claim 1, wherein the coating is disposed on at least one of the two surfaces of the automotive window glass, and the second surface of the second material layer faces the at least one of the two surfaces of the automotive window glass.

29. The coating according to claim 1, wherein the second surface of the second material layer is uncoated with polyethyleneterephthalate (PET), polyurethane, polycarbonate, acrylonitrile butadiene styrene copolymers or polymethyl methacrylate.

30. The automotive window according to claim 28, wherein the second surface of the second material layer is in contact with said at least one of the two surfaces of the automotive window glass.

* * * * *